May 1, 1934.  H. O. EDWARDS  1,956,985
SANDER FOR MOLDED EDGES
Filed Nov. 8, 1932  2 Sheets-Sheet 1
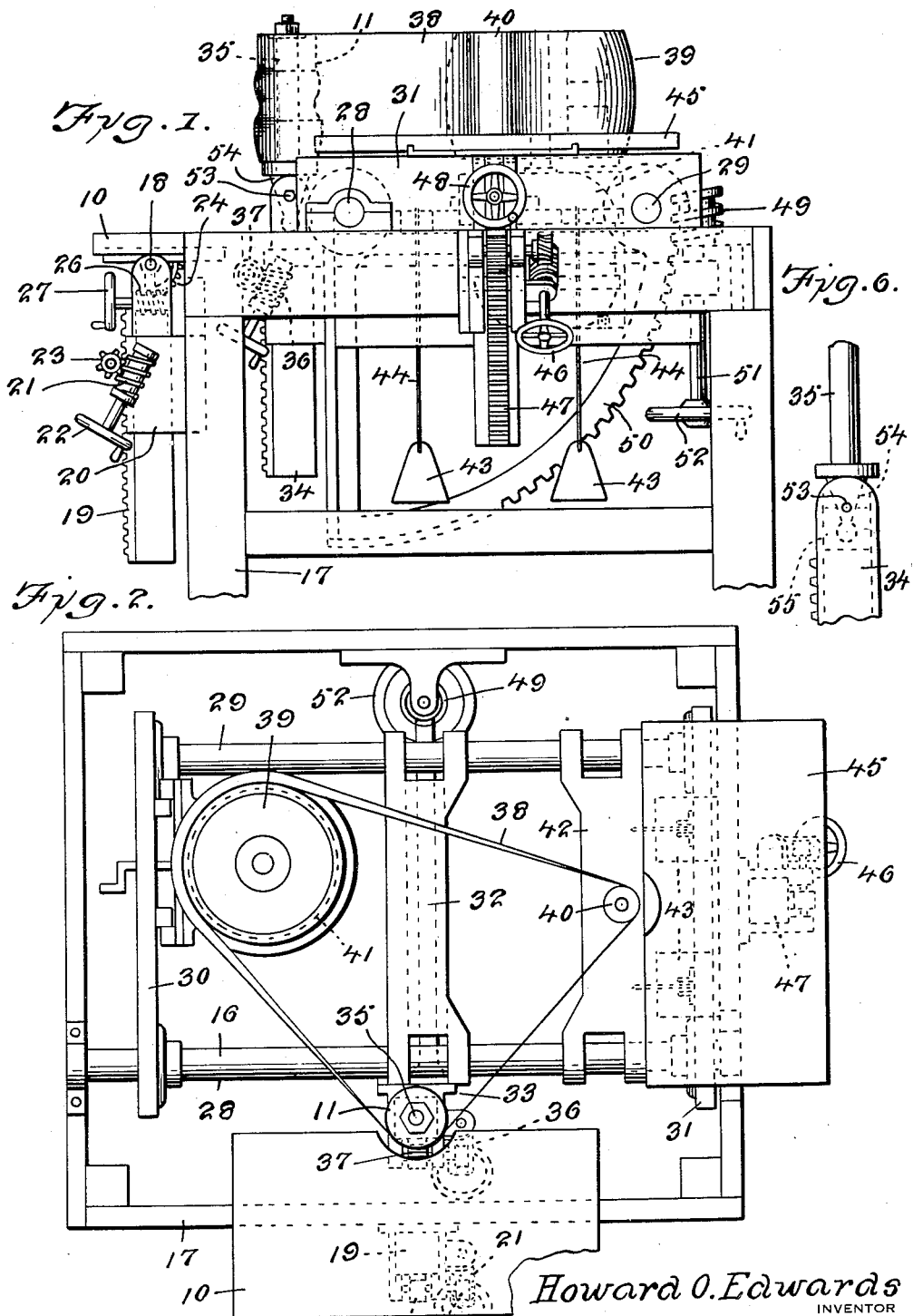
Howard O. Edwards
INVENTOR
BY Victor J. Evans & Co.
ATTORNEY

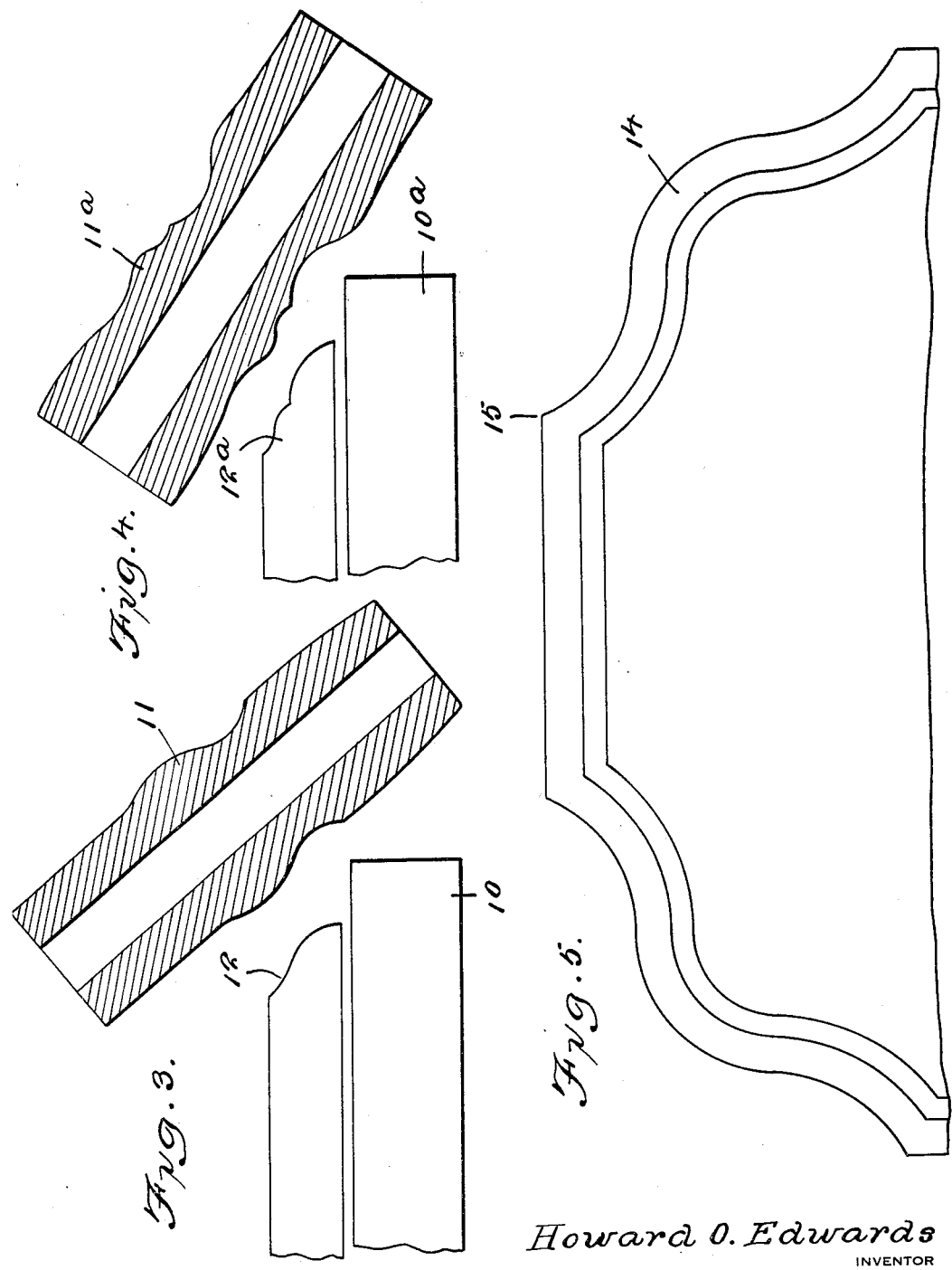

Patented May 1, 1934

1,956,985

UNITED STATES PATENT OFFICE 1,956,985

SANDER FOR MOLDED EDGES

Howard O. Edwards, Portland, Oreg.

Application November 8, 1932, Serial No. 641,789

3 Claims. (Cl. 51—135)

The object of the invention is to provide means for sanding molded edges so that the sanding spindle, while conforming to the edge to be molded, may be made with its depressed portions shallow, as distinguished from the conventional spindle whose axis of rotation is perpendicular to the work-table, thus obviating undue strains on the sanding belt to have the latter conform to the contour of the spindle; to provide a machine of the kind indicated wherein means is provided for adjusting the angular relation of the spindle and table to position the former with its axis substantially parallel to the general plane of inclination of the molded edge to be sanded; to provide a construction of the kind indicated in which the spindle is axially adjustable, so that its position with respect to the belt may be varied to prevent undue wear at fixed points on the latter; and generally to provide a molding sander which is of simple form and susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 1 is a side elevational view of a sander embodying the invention.

Figure 2 is a top plan view.

Figure 3 is a detail elevational view, partly in section, illustrating the angular position of the spindle with reference to the edge to be molded, where the molded edge is formed on graceful curves.

Figure 4 is a view similar to Figure 3 but showing a more pretentious form of molded edge.

Figure 5 is a plan view of a portion of a table top having a molded edge formed on alternate curved and straight lines, for the sanding of which the invention is particularly adapted.

Figure 6 is a detail elevational view of the spindle stud and connected rack bar.

Generally, in the sanding operation of molded edges, the table 10 and spindle 11 are disposed in fixed right-angular relation, so that the spindle must carry a peripheral recess of comparatively great depth, in order for the sanding belt which traverses the spindle to be brought in contact with the molded edge 12 throughout the extent thereof. If the table and spindle are given a relative inclination, as shown in Figures 3 and 4, the depressions and bulges on the spindle to make it conform to the molded edge may be comparatively shallow and less pronounced, since the axis of the spindle is then substantially parallel to the general inclination of the molded edge. By having the bulge portions reduced in height and the depressions in depth, there is not nearly so much strain on the sanding belt, as when the spindle has to be cut deep enough to permit the extension of the molded edge into the full depth of the latter. This plan also applies with reference to a block, if the molding be done by the latter, for if the block have its work face inclined with respect to the edge to be sanded, just as is done with reference to the spindle, the depressions and rises do not have to be nearly so pronounced as were the block held perpendicular to or parallel with the slab whose molded edge is to be dressed.

If the molded edge be of the contour shown at 12ª in Figure 4, it is of a form in which the spindle, 11ª, if perpendicular to the table 10ª, could hardly be made to reach the depressed portions in the molding formation.

By the inclination of the table or spindle and the shallow depressions that this plan makes possible in the spindle, molded edges of the general form indicated at 14 may be effectively sanded, as the spindle may be made to follow the sinuous outline of the curved portions without knocking off the corners indicated at 15. A molded edge of the form shown at 14 could not be sanded by the block method and yet leave the corners 15 intact, where the curved portions of the edge connect with the straight portions.

In carrying out the plan of the invention, it is proposed to angularly adjust the plane of the table 10, as well as the axis of the spindle 11 and to this end the latter is mounted on an angularly adjustable frame 16 carried in the main frame 17 on which the table 10 is mounted. The table 10 has a pivotal connection 18 with the upper end of a rack bar 19, the latter being carried in a guide 20, supported by the frame 17. The rack bar is slidably mounted in the guide and it is elevated and lowered through the instrumentality of a worm 21 rotated by means of a hand wheel 22 and in mesh with a worm wheel 23 carried on a common shaft with the spur gear 24 which meshes with the rack. This arrangement provides for vertical adjustment of the table which is obviously essential, and the angular adjustment is effected through the medium of a worm sector 25 carried by the table and engaging a worm 26 mounted in the rack bar at the upper end of the latter and rotated through the medium of the hand wheel 27. Obviously rotation of the hand wheel 27 will effect angular or swinging movement of the table on its pivotal mounting 18.

The frame 16 by which the spindle 11 is carried is mounted to swing on the bar 28 as a pivot, this bar being mounted in the ends of the frame 17 and being parallel to a bar 29 with which the head frames 30 and 31 are connected. The bar 29 terminates at the head frames 30 and 31 but the bar 28, as aforesaid, extends to the ends of the main frame 17. Spanning the frame 16 and seated on the bars 28 and 29 is a saddle frame 32 on which is mounted a guide 33 in which is slidably mounted a rack bar 34, the latter carrying at its upper end a stud 35 on which the spindle 11 is rotatably mounted. Axial adjustment of the rack bar 34, and consequently axial adjustment of the stud 35 and spindle 11, is accomplished through the instrumentality of the worm 36 and associated gear connections 37 with the rack bar.

The sanding belt 38 by which the sanding operation is carried out is trained over the spindle 11, over a drum 39 and an idler roll 40, the drum being carried on the shaft of a motor 41 mounted on the end frame 30.

The idler roll 40 is rotatably mounted on a crosshead 42 slidably mounted on the bars 28 and 29 and yieldingly impelled in a direction away from the drum by reason of the weights 43, secured to the terminals of flexible members 44 which are connected to the crosshead and trained over direction pulleys.

Positioned adjacent the idler roll 40 is a table 45 which is vertically adjustable by the hand wheel 46 and its operative connections with the rack bar 47 and which is angularly adjustable by means of a hand wheel 48 which is operatively connected with it in the same manner as the hand wheel 27 is connected with the table 10, the table 45 being pivotally mounted at the upper end of the rack bar 47.

The table 45 may be employed for work where it may be desired to use the flat face of the idler roll 40.

The frame 16 which comprises the end frames 30 and 31 and the bars 28 and 29 is elevated and lowered on the bar 28 as a pivot when the worm 49 is actuated, the worm being in mesh with a worm sector 50 which is connected with or formed as an integral part of the saddle 32. The worm 49 is rotatably mounted in the main frame 17 and carries at the lower end of its shaft 51 a hand wheel 52 by means of which it may be easily rotated.

Obviously the table 10 may be inclined toward the spindle 11 if it is desired to incline the work rather than the spindle and this may be the preferable plan with some light classes of work. Generally, however, it is preferable to incline the spindle and under such conditions, the frame 16 is elevated on the rod 28 as a pivot by the actuation of the worm 49, until the spindle 11 is brought to the general inclination of the molded edge to be operated upon.

In order to position the spindle in the sanding belt 38, so that the same points on the latter may not be thus always subject to wear, vertical adjustment of the spindle is resorted to by the operation of the adjusting means consisting of the worm 36 and its associated gear connections with the rack bar 34.

Since effective operation calls for the lateral yielding of the spindle away from the work, so that the belt may not be torn or the work damaged, in the event of passing a tough spot on the work, the spindle stud 35, while normally in axial alignment with the rack bar 34, has a resilient connection which permits lateral movement. The spindle, has a pivotal connection 53 with the rack bar formed by a pin mounted in the latter and passing through an extension 54 on the lower end of the stud, the extension being extended below the pin and snugly entering a cushion member 55 of relatively hard rubber, seated in a socket in the rack bar. Obviously, this construction normally keeps the stud in alignment with the rack bar but it may swing in any direction permitted by movement on the pin, but always against the yielding pressure of the cushion.

The invention having been described, what is claimed as new and useful is:

1. A machine for sanding molded edges comprising a table, a spindle of the conformation of the edge to be sanded, a sanding belt trained over the spindle, means for driving the belt, means for varying the angular relation of the spindle and table to position the axis of the spindle parallel to the general plane of inclination of the molded edge to be sanded, and means for axially adjusting the spindle to change the position of the sanding belt on the latter.

2. A machine for sanding molded edges comprising a table, a spindle of the conformation of the edge to be sanded, a sanding belt trained over the spindle, driving means for said belt, means for adjusting the axis of the spindle angularly with respect to the table without imposing a twist to the belt, and means for adjusting the spindle axially to change the position of the sanding belt on the latter.

3. A machine for sanding molded edges comprising a table, a spindle of the conformation of the edge to be sanded, a swingingly mounted frame carrying the spindle, a motor driven drum mounted on said frame, a belt tensioning device also mounted on said frame, a sanding belt trained over the spindle, the belt tensioning device and the drum, means for adjusting the frame angularly with respect to the plane of the table, and means for axially adjusting the spindle to change the position of the belt thereon.

HOWARD O. EDWARDS.